United States Patent [19]

Dempsey

[11] 4,336,083
[45] Jun. 22, 1982

[54] METHOD OF PRODUCING KNIFE FOR CUTTING HOT METAL

[75] Inventor: Martin J. Dempsey, Bethel Park, Pa.

[73] Assignee: Asko, Inc., West Homestead, Pa.

[21] Appl. No.: 143,379

[22] Filed: Apr. 24, 1980

[51] Int. Cl.³ .................. C21D 9/00; B23D 25/06;
   B26D 1/56; B23K 9/00
[52] U.S. Cl. ................. 148/127; 76/101 R;
   83/316; 219/121 ED
[58] Field of Search .............. 148/127, 12.4;
   75/126 C; 219/121 ED, 137 R; 164/263;
   76/101 R; 83/316

[56] References Cited

U.S. PATENT DOCUMENTS

| 3,295,401 | 1/1967 | Rackoff | 75/126 C |
| 3,865,639 | 2/1975 | Bellot et al. | 148/127 |
| 3,946,630 | 3/1976 | Roehrig et al. | 164/263 |
| 4,087,593 | 5/1978 | Phelps et al. | 148/127 |

FOREIGN PATENT DOCUMENTS

| 522131 | 2/1956 | Canada | 148/12.4 |
| 51-97553 | 8/1976 | Japan | 219/121 ED |

*Primary Examiner*—Peter K. Skiff
*Attorney, Agent, or Firm*—Hymen Diamond

[57] ABSTRACT

A knife for shearing hot metal at temperatures between about 1400° F. and 2400° F. and particularly between about 1800° F. and 2200° F. Typically, the knife is used for shearing blooms or strands produced by continuous casting into billets at like high temperatures. The knife is composite including a base of alloy tool steel, specifically AISI 4130 and a cutting edge of a high-temperature-resistant alloy, specifically INCONEL Alloy 718. These alloys are weld compatible and are joined into a mechanically sturdy unit by an electron-beam fusion weld, carried out in an evacuated atmosphere substantially free of oxygen to preclude reaction of oxygen with the alloy components such as Ti having a high affinity for oxygen.

3 Claims, 7 Drawing Figures

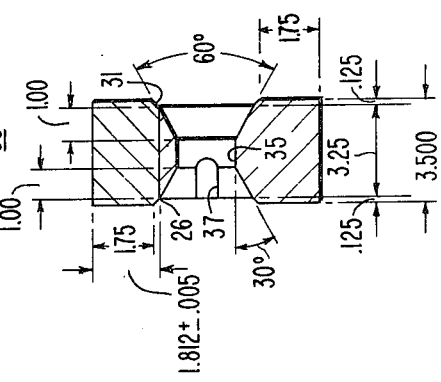
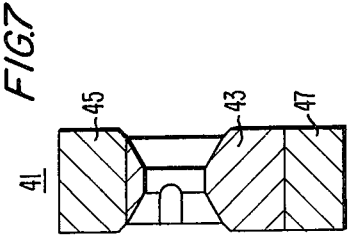
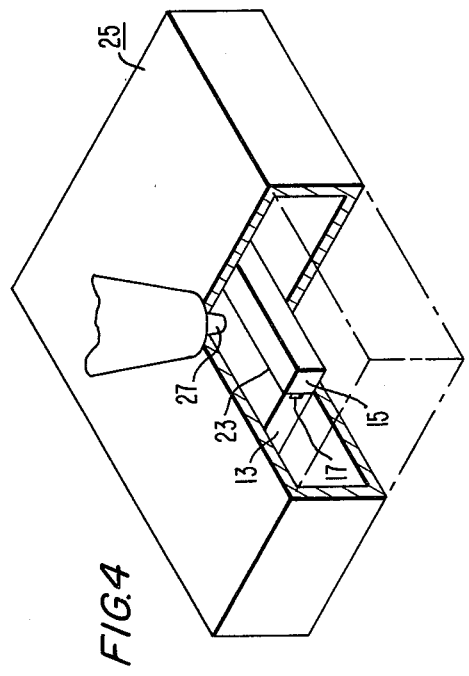
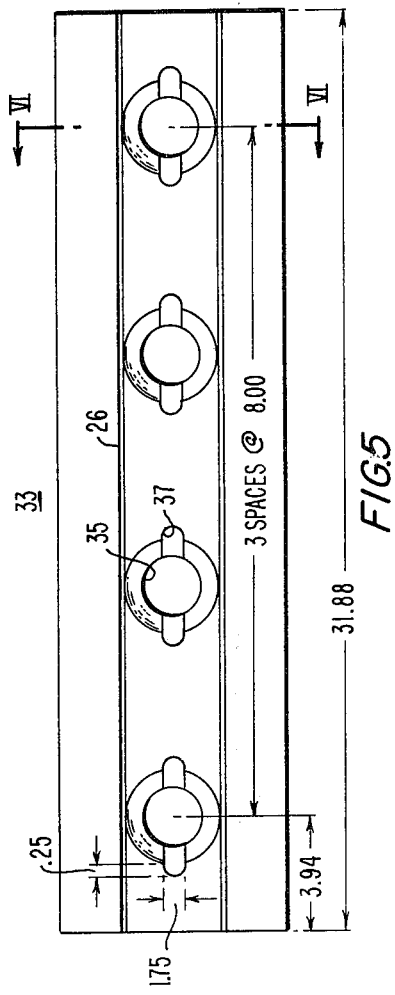

METHOD OF PRODUCING KNIFE FOR CUTTING HOT METAL

BACKGROUND OF THE INVENTION

This invention relates to the art of metal cutting or shearing and has particular relationship to knives for cutting such metal while it is at high temperatures. In the typical shearing of metal, the part to be cut is interposed between the pair of knives, and the knives are brought together so that the part is sheared between their cutting edges. The knives may be referred to as upper and lower knives. In one practice which is followed, the part to be cut is placed on the surface of the cutting edge of one knife, the lower knife, generally at right angles to the knife, i.e., generally parallel to the surface. The part extends over this surface with the line along which the cut is to be made along the cutting corner of the knife. A second knife, the upper knife, reacts with the lower knife to shear the part. One knife is moved relative to the other or both knives are moved. For example, the upper knife is moved downwardly relative to the first knife with the cutting corner of the second knife parallel to the cutting corner of the first knife. The cutting corner of the upper knife moves through the part to be cut near the cutting corner of the first knife. The part to be cut is sheared between the cutting corners of the two knives. The lower knife may move relative to the upper knife or both knives may move together.

Typically, this invention concerns itself with the cutting of hot metal such as blooms, billets, slabs or bars with knives which operate as described above. A bloom is a semi-finished product which is rolled from an ingot. While being cut the bloom is at temperatures between 1800° F. and 2200° F. The temperature may, however, be at times as low as 1400° F. and as high as 2400° F. Such knives are also used in cutting billets from strands produced by continuous casting. In this application, the expression "high temperature" means generally a temperature between about 1400° F. and 2400° F., but predominately between 1800° F. and 2200° F.

In accordance with the teaching of earlier prior art, knives of alloy tool steel were used in cutting metal at high temperatures. Knives of alloy tool steel in this service had a relatively short life in continuous use, typically about two weeks notwithstanding that they were water cooled during the shearing. The users of these knives were plagued by the high cost of the numerous knives which were required in their operations, by the down time and by the cost of continually replacing the knives.

More recently the practice has been adopted of using knives made of so-called super alloys or high-temperature alloys such as INCONEL Alloy 718. This alloy is high-temperature resistant and knives of this alloy have a service life in continuous use before requiring regrinding of many weeks, typically of three months or more. The expression "high-temperature resistant" as used in this application means resistant to temperatures substantially exceeding 2000° F. As applied to an alloy, this expression means that a knife composed of this alloy when used continuously for cutting metal at high temperatures has a life, before requiring regrinding, of several months or longer. In this kind of service this alloy must be subjected to heat treatment (age hardening) before being used. INCONEL Alloy 718 has substantially the following nominal composition in weight percent:

| | |
|---|---|
| Nickel | 52.5 |
| Chromium | 19.0 |
| Molybdenum | 3.0 |
| Columbium | 5.1 |
| Aluminum | 0.5 |
| Titanium | 0.9 |
| Iron | 18.5 |
| Manganese | 0.2 |
| Silicon | 0.2 |
| Carbon | 0.04 |

INCONEL Alloy 718 is costly. Typically it costs in excess of $9.00 per pound. A typical blank for a knife weighs about 1300 pounds having a cost in excess of $11,7000.00. The fabrication costs to make this knife are substantial. A knife of INCONEL alloy ready for use may cost about $17,000.00 or more.

It is an object of this invention to overcome the drawbacks of the prior art and to provide a high-temperature resistant knife for cutting metal at high temperatures which, while not excessively costly, will have a long life before requiring regrinding. There is an advantage in addition to the cost advantage in achieving this object. The achievement will substantially conserve important alloying elements such as molybdenum, columbium, nickel, chromium and others which are urgently needed in the aircraft industry particularly for defense.

SUMMARY OF THE INVENTION

In accordance with this invention a composite knife is provided. This knife has a base and a cutting edge or cutting edges. The base is composed of a far leaner alloy in alloying elements than the super alloys. Typically, the base may be carbon steel, low-alloy steel, alloy tool steel, stainless steel, or even a compatible leaner variety of super alloy. The cutting edge or edges is or are of high-temperature-resistant material. The material of the base is weld compatible with the alloy of the cutting edges and the cutting edges are welded to the base. INCONEL Alloy 718 is uniquely suitable for a cutting edge as has been demonstrated by the costly knives composed of this alloy. Alloy tool steel AISI 4130 is uniquely suitable for a base. AISI Alloy 4130 has substantially the following nominal composition in weight percent:

| | |
|---|---|
| Carbon | 0.30, typically .28 to .33 |
| Manganese | 0.48 |
| Phosphorous | 0.015 |
| Sulfur | 0.015 |
| Silicon | 0.20 |
| Nickel | 0.12 |
| Chromium | 0.91 |
| Molybdenum | 0.20 |
| Iron | Remainder |

This alloy is weld compatible with INCONEL Alloy 718 and a sound high strength weld is produced between these parts to produce a reliable composite knife. Typically a fusion weld produced by electron-beam welding forms the joint between the cutting edge and the base. The thickness or depth of the seam between the surfaces that form the joint between the cutting edge and the base is typically too great to permit a weld which penetrates from one face to the opposite face of the base and cutting edge, to be produced with electron-beam power of reasonable magnitude. In the practice of this invention the parts are welded by welding first from one side to an intermediate region, typically the center, and then from the opposite side to the intermediate region. To preclude the accumulation of weld metal in the region where the welds from the opposite sides meet, a relief slot is provided in the base.

While the composite structure formed of a cutting edge of INCONEL Alloy 718 and a base of AISI-4130 alloy steel is unusually suitable, other alloys may be used for both of the components. Among the alloys which can be used for a cutting edge are HASTELLOY X, HASTELLOY S, RENE 41, RENE 95, WASPALLOY, NIMONIC 90, Iron-Nickel Alloys A 286 and 901 and others.

The nominal compositions of these alloys are given in a pamphlet of International Nickel Co., entitled *Nickel Base Alloys,* Copyright 1977, Third Edition, and are presented in the following Table I.

TABLE I

|    | HASTELLOY X | HASTELLOY S | RENÉ 41 | RENÉ 95 | WASPALLOY | NICKEL-IRON 901 | NICKEL-IRON A286 | NIMONIC-90 |
|----|------|------|------|------|------|------|------|------|
| Ni | 47   | 67   | 55   | 61   | 58   | 42.5 | 26   | 59   |
| Cr | 22   | 15.5 | 19.0 | 14.0 | 19.5 | 12.5 | 15.0 | 19.5 |
| Co | 1.5  |      | 11.0 | 8.0  | 13.5 |      |      | 16.5 |
| Mo | 9.0  | 14.5 | 10.0 | 3.5  | 4.3  | 5.7  | 1.3  |      |
| W  | 0.6  |      |      | 3.5  |      |      |      |      |
| Fe | 18.5 | 1.0  |      |      |      | 36   | 54   |      |
| Mn | 0.50 | 0.50 |      |      |      | 0.10 | 1.35 | 0.30 |
| Si | 0.50 | 0.40 |      |      |      | 0.10 | 0.50 | 0.30 |
| C  | 0.10 | 0.02M* | 0.09 | 0.15 | 0.08 | 0.05 | 0.05 | 0.07 |
| Al |      | 0.20 | 1.5  | 3.5  | 1.3  | 0.2  | 0.2  | 1.45 |
| Cb |      |      |      | 3.5  |      |      |      |      |
| Zr |      |      |      | 0.05 | 0.06 |      |      | 0.06 |
| B  |      |      | 0.005 | 0.010 | 0.006 | 0.015 | 0.015 | 0.003 |
| Ti |      |      | 3.1  | 2.5  | 3.0  | 2.8  | 2.0  | 2.45 |

*Maximum

Among the alloys which can serve for the base in addition to AISI 4130 are the alloy tool steel AISI 8620, and stainless steels AISI 302 and AISI 410. In addition, the nickel-iron alloy A 286 may at times serve for base as well as for cutting edge.

The compositions of 8620, 302 and 410 are presented in Table II:

TABLE II

|     | 8620 | 302 | 410 |
|-----|------|------|------|
| C   | 0.20 | 0.15M | 0.15M |
| Mn  | 0.80 | 2.00M | 1.00M |
| Si  | 0.30 | 1.00M | 1.00M |
| Ni  | 0.55 | 9.00 |      |
| Cr  | 0.45 | 18.00 | 12.50 |
| Mo  | 0.20 |      |      |
| Fe  | Remainder | Remainder | Remainder |

BRIEF DESCRIPTION OF THE DRAWINGS

For a better understanding of this invention, both as to its organization and as to its method of operation, together with additional objects and advantages thereof, reference is made to the following description taken in connection with the accompanying drawings, in which:

FIG. 4 is a view in perspective showing the manner in which the composite blank is formed;

FIG. 5 is a plan view of a finished knife in accordance with this invention;

FIG. 6 is a view in transverse section taken along line VI—VI of FIG. 5; and

FIG. 7 is a view in transverse section of a modification of this invention.

Dimensions of a typical knife in accordance with this invention are shown in FIGS. 1, 2, 3, 5 and 6 only for the purpose of aiding those skilled in the art in practicing this invention. It is not intended that the scope of this invention should in any way be limited by the presentation of the dimensions.

DETAILED DESCRIPTION OF EMBODIMENT

Figure 2:
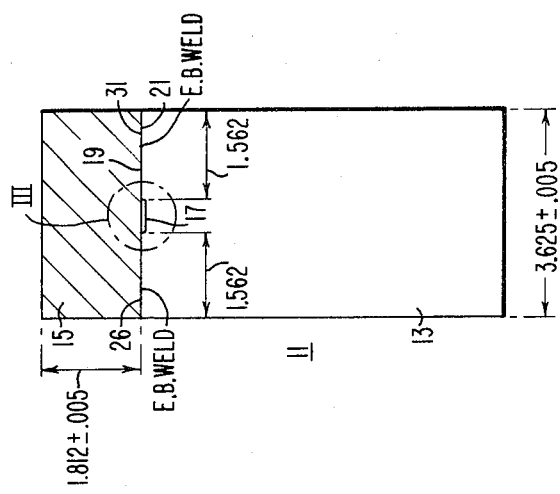
FIG. 2 is a view in end elevation, with the scale enlarged relative to FIG. 1 and with the cutting-edge bar sectioned of the blank shown in FIG. 1.
Figure 1:
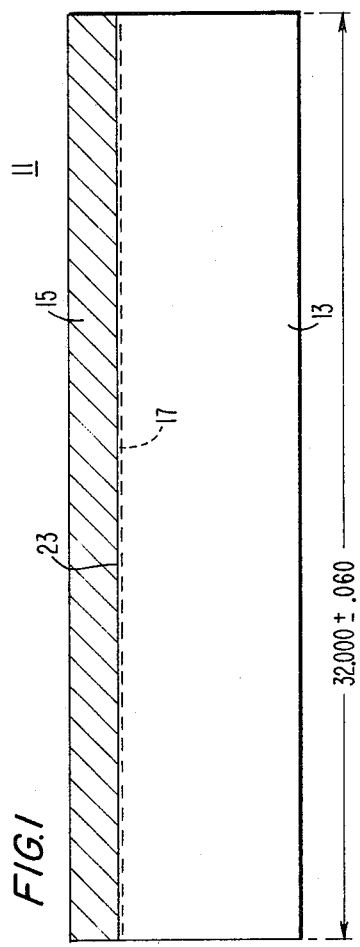
FIG. 1 is a plan view with the cutting edge block or bar sectioned showing a blank for a composite knife in accordance with this invention.
Figure 3:
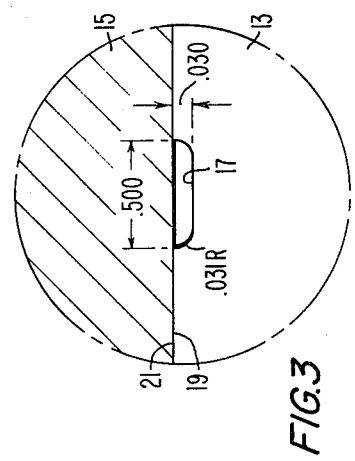
FIG. 3 is an enlarged view of the portion of the blank in circle III of FIG. 2.

The blank 11 for a knife in accordance with this invention, shown in FIGS. 1, 2, 3, includes a first or base blank 13 of alloy steel and a second or cutting-edge blank 15 of a high-temperature resistant alloy. Specifically, the base blank is advantageously composed of AISI 4130 alloy steel and the cutting-edge blank of INCONEL Alloy 718.

In the practice of this invention, a slot 17 is formed, symmetrically about the longitudinal center and along the whole length of the base, in the surface 19 of the base blank which is to be joined to the cutting-edge blank. The base blank 13 and the cutting-edge blank 15 are abutted at their surfaces 19 and 21 to form a seam 23 (FIG. 4) between these surfaces. The unit is placed in an evacuated container 25 (FIG. 4) and a first welded joint 26 (FIGS. 5,6) is produced along the length of the unit by an electron-beam gun 27 between the edge of the seam 26 facing the gun and the slot 17. The unit is then inverted and a second welded joint 31 is produced along the length of the unit between the outer edge of the seam 23 and the slot 17. The slot 17 is of sufficient volume to absorb the weld metal at the end of each weld. A knife blank is thus formed. The knife blank is heat treated to harden the cutting edge 15 and stess-relieve the base 13. Then the blank is finished to form the knife 33 shown in FIGS. 5 and 6. The knife blank is ground to proper dimensions. The holes 35 for securing the knife to its supporting fixture (not shown) are drilled and counterbored. The holes are provided with chip grooves 37 which are engaged by lateral projections on the bolts which secure the knife 33 to the fixture.

FIG. 7 shows a knife 41 having a base 43 and cutting edges 45 and 47 on both sides of the base. The edges 45 and 47 are composed of high temperature resistant alloys and the base 43 of a material far leaner in alloying elements.

EXAMPLE

A bar (15) of INCONEL Alloy 718 was ground to length 32"±0.010" width 3.620"±0.003", thickness 1.810"±0.003". Before being ground the bar was annealed by solution treating. It was raised to 1800° F. and held at this temperature for one hour and then air cooled in still air to room temperature.

A bar (13) of AISI Alloy 4130 was ground to length 32"±0.010", width 6.380"±0.003", 3.620"±0.003".

A groove (17) dimensioned as shown in FIG. 3, was formed centrally in the 4130 bar. The groove was 0.500" wide and 0.030" deep and extended along the length of the 4130 bar.

The INCONEL bar and the AISI bar were abutted with the thickness dimension of the INCONEL bar coextensive with the width dimension of the AISI bar and the width dimension of the INCONEL bar coextensive with the thickness dimension of the AISI bar and the length dimensions of the bars coextensive.

A welded joint (26) was produced as described above.

The welded assembly was heat treated as follows:
Aged at 1325° F. for eight hours.
Cooled slowly at 100° F. per hour to 1150° F.
Held at 1150° for ten hours.
Air cooled to room temperature. The Rockwell hardness was:
INCONEL alloy 718 cutting edge (15) 43/46 Rc
AISI alloy 4130 base (13) 20/30 Rc
The surfaces defined by the length and the width dimensions (32×8.188 approximately)—Minimum stock was removed to clean surfaces.

The edges were ground. Minimum stock was removed to clean the edges' surfaces.

The holes 35 were drilled and countersunk as shown in FIGS. 5 and 6 and the grooves 37 were formed.

The unit was counter planed.

The surfaces defined by the length and width dimensions, the edges and the end surfaces were finish ground.

Knives formed as described above were used to cut hot blooms. During the cutting the knives were cooled with a water spray or water mist so that they were maintained at about 1000° F. The knives performed satisfactorily.

While preferred embodiments of this invention have been disclosed herein, many modifications thereof are feasible. This invention is not to be restricted except insofar as is necessitated by the spirit of the prior art.

I claim:

1. The method of producing a knife for cutting metal at high temperature, said knife being produced from parts to be joined including a first blank for a base composed of alloy steel and a second blank for a cutting edge composed of a high-temperature-resistant alloy, said alloy steel having substantially the following nominal composition in weight percent:
C—0.30
Mn—0.48
P—0.015
S—0.015
Si—0.20
Ni—0.12
Cr—0.91
Mo—0.20
Fe—Remainder,
said high-temperature-resistant alloy having substantially the following nominal composition in weight percent:
Ni—52.5
Cr—19.0
Mo—3.0
Cb—5.1
Al—0.5
Ti—0.9
Fe—18.5
Mn—0.2
Si—0.2
C—0.04,
the said method comprising forming a relief slot along the length of the surface of said first blank, which surface is to be joined to said second blank, said relief slot extending internally of the ends of said first blank and being short compared to the width of said surface but being effective to absorb weld metal of welds terminating at said slot, abutting said second blank and said first blank to form a seam along the lengths of said first and second blanks, with the surface of said second blank which is to be joined to said first blank abutting said slotted surface of said first blank and said relief slot extending between said surfaces along the length of said seam, producing a first weld along the length of said seam between said surfaces of said first and second blanks, said first weld extending from one external boundary of said seam inwardly to a position near the end of said relief slot nearest said one boundary, producing a second weld along the length of said seam between said surfaces of said first and second blanks, said second weld extending from said opposite boundary of said seam inwardly to a position near the end of said relief slot nearest said opposite boundary, said welding forming a blank for said knife, hardening said blank of said knife in the following steps:
Age at about 1350° F. for 8 hours
Cool to about 1150° F. in steps of 100° F. per hour
Hold at about 1150° F. for about 10 hours
Air cool to room temperature—about 70° F. and finishing said blank to form a knife.

2. The method of producing a knife for cutting metal at high temperature, said knife being produced from parts to be joined including a first blank for a base composed of alloy steel and a second blank for a cutting edge composed of a high-temperature-resistant alloy, said alloy steel being one of the class of alloys consisting of AISI Alloy 4130 whose composition is presented on page 4 hereof, AISI Alloys 8620, 302 and 410 whose compositions are presented on Table II hereof and A286 Alloy whose composition is presented in Table I hereof and said high-temperature-resistant alloy being one of the class of alloys consisting of INCONEL Alloy whose composition is presented on page 3 hereof and RENE Alloy 41, RENE Alloy 95, WASPALLOY Alloy, Nickle-Iron Alloys 901 and A286, and NIMONIC-90 Alloy whose compositions are presented in Table I hereof, the said method comprising forming a relief slot along the length of the surface of said first blank, which surface is to be joined to said second blank, said relief slot extending internally of the ends of said first blank and being short compared to the width of said surface but being effective to absorb weld metal of welds terminating at said slot, abutting said second blank and said first blank to form a seam along the lengths of said first and second blanks, with the surface of said second blank which is to be joined to said first blank abutting said slotted surface of said first blank and said relief slot extending between said surfaces along the length of said seam, producing a first weld by fusion welding in an evacuated atmosphere along the length of said seam between said surfaces of said first and second blanks, said first weld extending from one external boundary of said seam inwardly to a position near the end of said relief slot nearest said one boundary, producing a second weld by fusion welding in an evacuated atmosphere along the length of said seam between said surfaces of said first and second blanks, said second weld extending from said opposite boundary of said seam inwardly to a position near the end of said relief slot nearest said opposite boundary, said welding forming a blank for said knife, hardening said blank of said knife heat treating the blank of said knife to harden the cutting edge and stress relieve the base and finishing said blank to form a knife.

3. The method of claim 1 wherein the first and second welds are produced by electron-beam welding in the evacuated atmosphere.

* * * * *